United States Patent [19]

Kirner

[11] 4,126,868

[45] Nov. 21, 1978

[54] AIR VENTING DEVICE FOR INK SUPPLY SYSTEMS OF INK MOSAIC PRINTERS

[75] Inventor: Wilhelm Kirner, Munich, Germany

[73] Assignee: Siemens Aktiengesellschaft, Berlin & Munich, Germany

[21] Appl. No.: 721,950

[22] Filed: Sep. 10, 1976

[30] Foreign Application Priority Data

Sep. 29, 1975 [DE] Fed. Rep. of Germany ....... 2543452

[51] Int. Cl.[2] ........................ G01D 15/16; B41J 27/00

[52] U.S. Cl. ................................................ 346/140 R

[58] Field of Search .............................. 346/140 R, 75

[56] References Cited

U.S. PATENT DOCUMENTS

| | | | |
|---|---|---|---|
| 3,708,798 | 1/1973 | Hildenbrand | 346/140 R |
| 3,747,120 | 7/1973 | Stemme | 346/140 R X |
| 3,805,276 | 4/1974 | Ishii | 346/140 R |
| 3,953,862 | 4/1976 | Amberntsson | 346/140 R |
| 4,015,272 | 3/1977 | Yamamori | 346/140 R |

*Primary Examiner*—Joseph W. Hartary
*Attorney, Agent, or Firm*—Hill, Gross, Simpson, Van Santen, Steadman, Chiara & Simpson

[57] ABSTRACT

An air venting or bleed device for the ink supply systems of ink jet printer unit in which individual printing jets are connected through a distributor arrangement and supplied with printing liquid from a reservoir, with air being bled from the reservoir through an air-bleed passage disposed in the device and communicating at one end with the reservoir, and at the other with the surrounding air, the air-bleed passageway having a diameter sufficiently small to produce a capillary effect.

7 Claims, 2 Drawing Figures

AIR VENTING DEVICE FOR INK SUPPLY SYSTEMS OF INK MOSAIC PRINTERS

BACKGROUND OF THE INVENTION

The present invention relates to an air bleeding device for ink supply systems of ink-jet printer structures in which individual printing jets are supplied with printing liquid from a reservoir through a distributor arrangement connecting the respective jets therewith. In general ink operated mosaic printer units, utilizing several piezoelectrically operated printing jets, the printing liquid is supplied from a reservoir to a distributor structure which operatively communicates with each of the individual jets. In operation, each individual printing jet is energized by means of a voltage pulse from a character generator, whereby the piezoelectric drive element contracts, creating pressure waves which drive an ink droplet out of the jet orifice, with the ink directly impacting a data carrier arranged in opposition to the printer head.

In order to provide efficient continuous printing operation, it is necessary to prevent fluctuations in the compressibility of the liquid ink contained in the printing jet, as a result of air entrained in the liquid. Such entrained gas bubbles lead to the breakdown of the printing jet and thereby necessitate that the ink supply system include an air bleeding device.

German OS No. 2,262,106 (U.S. Pat. No. 3,708,798) discloses an ink supply system for an ink jet printer in which a distribution member is disposed between the actual ink reservoir and the individual printing jets, such distribution member functions as an intermediate reservoir and comprises a metal cylinder, provided at its upper end with a plug which can be unscrewed, and which is sealed by means of a sealing ring. Air bubbles entrained in the printing liquid are collected in such distributor structure in the form of a volume of air beneath the plug. Thus, the distributor structure can be bled of air by partially unscrewing the plug to permit discharge of the entrapped air.

This type of venting by the use of a plug which must be unscrewed, not only is relatively laborious but is also inaccurate and presents the attendant risk of the operator suffering ink soilage.

BRIEF SUMMARY OF THE INVENTION

The present invention therefore has among its objects the provision of an air venting device for an ink supply system utilized in ink-jet printer units and the like, by means of which it is possible to remove the air collecting in the ink supply system in a much simpler and more efficient manner.

The desired results are achieved, in accordance with the invention, by providing an air vent passageway which operatively connects the ink supply system and the surrounding atmosphere, with such passageway having a sufficiently small diameter that it produces a capillary action. In accordance with a further development of the invention the vent passageway is provided with an enlargement adapted to receive printing liquid at the end thereof communicating with the surrounding atmosphere.

In accordance with a further advantageous development of the invention, the vent device is so disposed in the printer head that it is in the neighborhood of the highest point of the ink supply system.

The invention has the major advantage that it does away with all mechanically moving parts, such as float valves, removable plugs, etc., and thereby eliminates mishandling and inefficient bleeding action. The venting is effected in a very simple manner by virtue of the fact that the ink pressure is elevated by the application of pressure to the reservoir, whereby the liquid level is thereby increased and air accordingly forced through to the capillary. Upon completion of the venting operation, the capillary automatically closes. At the same time, the liquid column retained in the bleed passage by capillary action prevents external air from penetrating into the ink supply system and also prevents the ink from flowing back out of the distributor into the lower lying reservoir.

In a further advantageous embodiment of the invention, a drain passageway is provided communicating with an enlargement adapted to receive surplus ink and thereby drain the ink emerging from the capillary at the time of venting through an ink passage disposed in a mosaic printer head and directed in the same general manner as the printing jets.

BRIEF DESCRIPTION OF THE DRAWINGS

In the drawings wherein like reference numerals indicate like or corresponding parts.

DETAILED DESCRIPTION OF THE INVENTION

Figure 1:
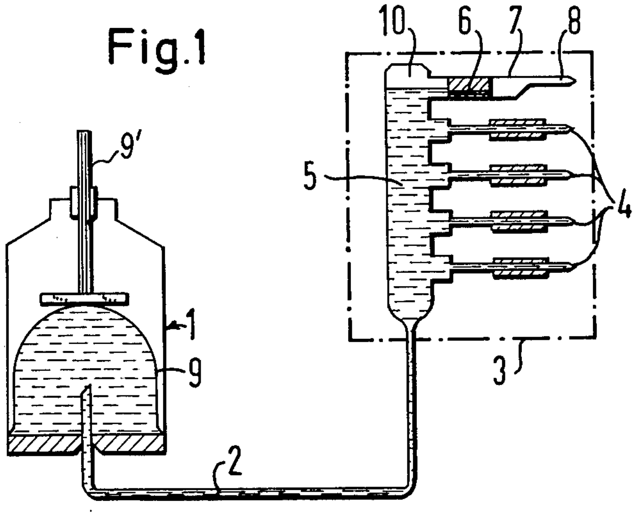
FIG. 1 schematically illustrates an air-bleeding device in accordance with the invention.

Referring to FIG. 1, the reference numeral 1 designates generally an ink reservoir container which communicates through a line 2 with a printer head, indicated generally by the numeral 3. The printer head contains a plurality of piezoelectric jets 4 arranged at the pitch interval of the mosaic grid, by means of which ink jets are ejected in droplet manner, and in accordance with the character being printed, in the cycle of operation of a character generator, not illustrated herein. To supply all the printing jets 4 with ink, a distributor arrangement 5 is disposed to receive ink from the reservoir 1 and supply it to the jets 4, with the distributor arrangement 5 comprising a riser pipe or chamber with which all of the printing jets 4 communicate. Adjacent the highest point of the ink supply system, in this case at the top end of the distributor arrangement 5, is disposed a vent device in accordance with the present invention, comprising a narrow capillary tube 6 which connects the ink supply system with the surrounding atmosphere, with the end of the capillary tube 6 communicating with the atmosphere, having an enlargement 7 formed therein to receive excess printing ink.

The air collected in the distributor arrangement 5 can be very simply removed, prior to the operation of the ink-operated mosaic printer unit, in a very simple manner by manually applying a light pressure on the ink supply contained in the reservoir 1 to increase the ink pressure in the system. In the embodiment illustrated, this may be readily accomplished by applying pressure to the flexible wall 9 of the reservoir by means of a suitable hand-operated member 9'. As a result of the applied pressure, the liquid level in the riser pipe 5 gradually filling the printing jets 4, and as the jets fill up, air escapes through the capillary tube 6, with the exception of an air bubble 10 which serves to damp hydraulic vibrations. When the liquid level reaches the capillary 6 the printing ink enters the capillary and closes the same off. As the pressure is maintained, the ink passes through the capillary 6 and collects in the enlargement 7. In the event the latter fills up, the surplus drains off through a drain passage 8.

Air collecting in the riser pipe during operation of the printing system may be removed in a similar manner by increasing the liquid level in the riser pipe 5 by means of the hand-operated member 8 whereby air will be expelled through the capillaries until the printing liquid closes them off. If, in this context, the venting operation is prematurely discontinued before the capillaries have been reached by the rising liquid level, the ink contained in the enlargement 7 may return through the capillary 6 and close it off from the exterior, preventing the distributor arrangement from running empty.

Figure 2:
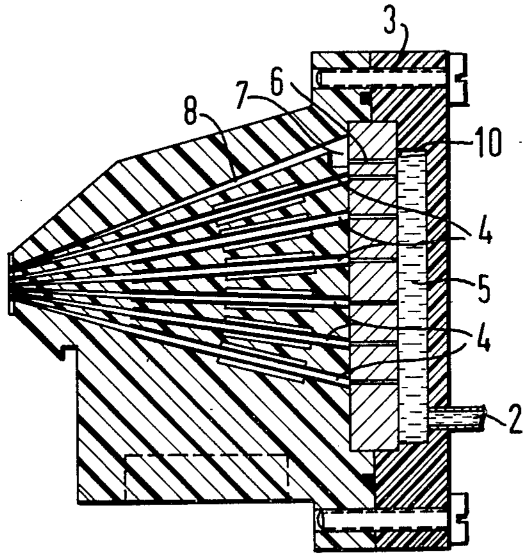
FIG. 2 is a sectional view through an ink-operated mosaic printer head, illustrating details of the vent structure.

It will be appreciated that in the construction illustrated in FIG. 2, the capillary 6 and passageway to the jets 4 are formed in a single member which is disposed between a block carrying the jet structures and a cooperable member which forms the riser 5.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. An air venting device for ink supply systems of jet printer units, comprising means forming an ink supply system connected to receive printing ink from a supply reservoir, means forming ink passageways connecting the respective ink jets with said supply system, the latter having an air venting passageway therein communicating at one end with the surrounding air, and at the other end with ink in said supply system, and which extends in the same direction as the printing jets, said air venting passageway having a diameter sufficiently small to produce a capillary effect, permitting venting of air from the supply system and simultaneously preventing undesired ink flow to the exterior and reverse air flow to the interior system adjacent the highest point thereof, supply system under pressure for expelling any air therein through such venting passageway to the atmosphere.

2. A device according to claim 1, wherein said supply system is formed, at least in part, with a printer head which carries the individual printing jets, said head having a distribution chamber which receives printing ink from such a reservoir, said connecting ink passageways extending from said distribution chamber to the respective ink jets, said air venting passageway being formed in the printer head and communicating with said distribution chamber adjacent the top thereof, and extending in the same direction as the printing jets.

3. An air venting device for ink supply systems of jet printer units, comprising means forming an ink supply system connected to receive printing ink from a supply reservoir, means forming ink passageways connecting the respective ink jets with said supply system, the latter having an air venting passageway therein communicating at one end with the surrounding air, and at the other end with ink in said supply system, and which extends in the same direction as the printing jets said air venting passageway having a diameter sufficiently small to produce a capillary effect, permitting venting of air from the supply system and simultaneously preventing undesired ink flow to the exterior and reverse air flow to the interior, said air venting passageway having an enlargement, for receiving printing liquid, at the end thereof opening to the atmosphere.

4. A device according to claim 3, wherein the means forming the ink supply system has a drain passageway therein which communicates with said enlargement for receiving surplus ink.

5. A device according to claim 4, wherein the means forming the ink supply system has a drain passageway therein connecting said enlargement with the atmosphere.

6. An air venting device for ink supply systems of jet printer units, comprising means forming an ink supply system connected to receive printing ink from a supply reservoir, means forming ink passageways connecting the respective ink jets with said supply system, the latter having an air venting passageway therein communicating at one end with the surrounding air, and at the other end with ink in said supply system, said air venting passageway having a diameter sufficiently small to produce a capillary effect, permitting venting of air from the supply system and simultaneously preventing undesired ink flow to the exterior and reverse air flow to the interior, said supply system being formed, at least in part, with a printer head which carries the individual printing jets and contains said connecting passages and said air venting passageways, said printer head having a drain passageway therein connecting the air venting passageway with the atmosphere, and which extends in the same direction as the printing jets.

7. An air venting device for ink supply systems of jet printer units, comprising means forming an ink supply system connected to receive printing ink from a supply reservoir, means forming ink passageways connecting the respective ink jets with said supply system, the latter having an air venting passageway therein communicating at one end with the surrounding air, and at the other end with ink in said supply system, said air venting passageway having a diameter sufficiently small to produce a capillary effect, permitting venting of air from the supply system and simultaneously preventing undesired ink flow to the exterior and reverse air flow to the interior, said supply system being formed, at least in part, with a printer head which carries the individual printing jets, said head having a distribution chamber which receives printing from such a reservoir, said connecting ink passageways extending from said distribution chamber to the respective ink jets, said air venting passageway being formed in the printer head and communicating with said distribution chamber adjacent the top thereof, and extending in the same direction as the printing jets, said air venting passageway having an intermediate portion of a diameter forming said capillary effect, said air venting passageway having an enlargement disposed between said intermediate portion and the end thereof communicating with the surrounding atmosphere.

* * * * *